United States Patent
Yu

(10) Patent No.: US 8,016,299 B2
(45) Date of Patent: Sep. 13, 2011

(54) APPARATUS FOR SHIFTING THE CENTER OF GRAVITY OF A VEHICLE HAVING THREE WHEELS OR MORE

(76) Inventor: Je-Woo Yu, Seoul (KR)

( * ) Notice: Subject to any disclaimer, the term of this patent is extended or adjusted under 35 U.S.C. 154(b) by 0 days.

(21) Appl. No.: 12/226,391

(22) PCT Filed: Nov. 27, 2006

(86) PCT No.: PCT/KR2006/005026
§ 371 (c)(1),
(2), (4) Date: Oct. 17, 2008

(87) PCT Pub. No.: WO2007/119917
PCT Pub. Date: Oct. 25, 2007

(65) Prior Publication Data
US 2009/0322043 A1    Dec. 31, 2009

(30) Foreign Application Priority Data

Apr. 18, 2006  (KR) .................... 20-2006-0010294 U
Oct. 9, 2006   (KR) ........................ 10-2006-0097986

(51) Int. Cl.
*B60G 17/015* (2006.01)
(52) U.S. Cl. ................................................. 280/5.508
(58) Field of Classification Search .................. 280/758, 280/124.103, 5.508, 5.509
See application file for complete search history.

(56) References Cited

U.S. PATENT DOCUMENTS

| | | | |
|---|---|---|---|
| 5,116,069 A | 5/1992 | Miller | |
| 5,396,423 A | 3/1995 | Fujimura et al. | |
| 6,039,335 A * | 3/2000 | Sheridan | 280/124.103 |
| 6,820,877 B1 * | 11/2004 | Ichimura et al. | 280/6.157 |
| 2006/0260857 A1 * | 11/2006 | Kakinuma et al. | 180/218 |
| 2010/0044977 A1 * | 2/2010 | Hughes et al. | 280/5.509 |

FOREIGN PATENT DOCUMENTS

KR    20-1996-0017360    6/1996

* cited by examiner

*Primary Examiner* — Faye M. Fleming
(74) *Attorney, Agent, or Firm* — Daniel P. Burke & Associates, PLLC

(57) ABSTRACT

An apparatus for shifting the center of gravity of a vehicle having three wheels or more is provided. The apparatus includes: a movable frame having a certain shape and movably fixed, at one side, to a vehicle body in such a manner that a portion or all of the frame is movable to the left/right side relative to the driving direction of the vehicle body; and a control unit for controlling the left/right movement of the frame to shift the center of gravity of the vehicle body as needed, the control unit including: a cylindrical rotation body in which a portion of the inside thereof including the center of rotation is open; a rotation bar coaxially coupled to the center of rotation of the rotation body to rotate with the rotation body along with the rotation of the rotation body; a first link member rotatably coupled, at its one end, to the rotation bar included inside the rotation body; and second link members crossed each other, each second link member having opposite ends wherein one end is rotatably coupled to the other end of the first link member, and the other end is rotatably coupled to the upper portion of the frame, whereby the center of gravity is shifted and restored more easily, effectively, and precisely, and upon stopping, the movement of the vehicle body is precisely controlled.

15 Claims, 6 Drawing Sheets

[Fig. 1]
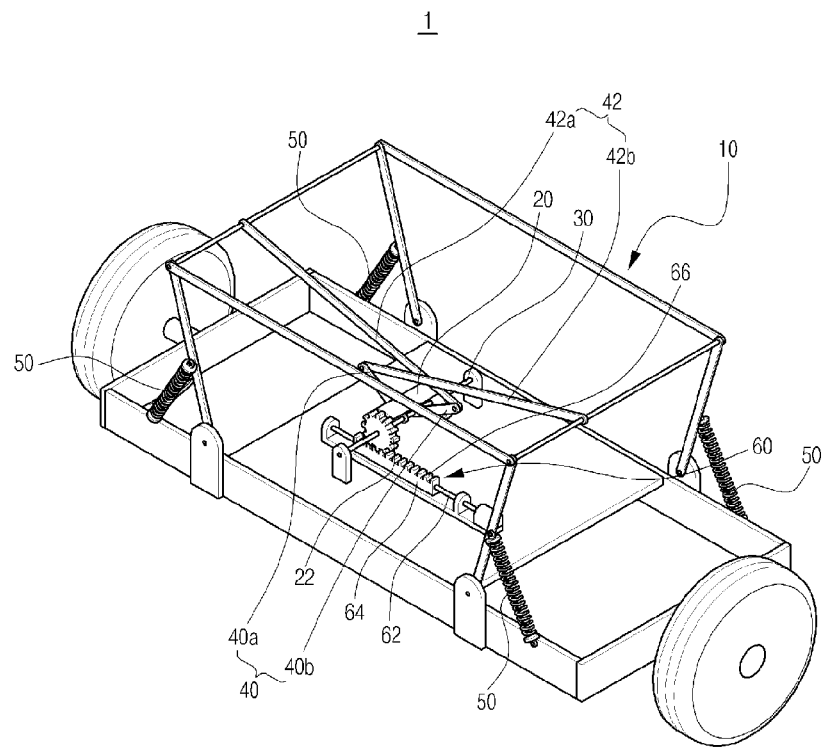
[Fig. 2]
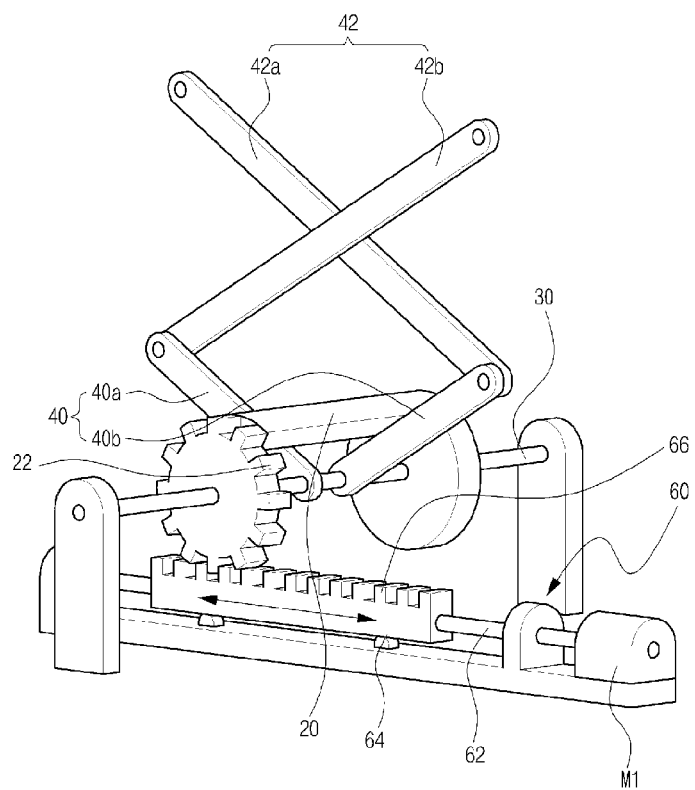

[Fig. 3]
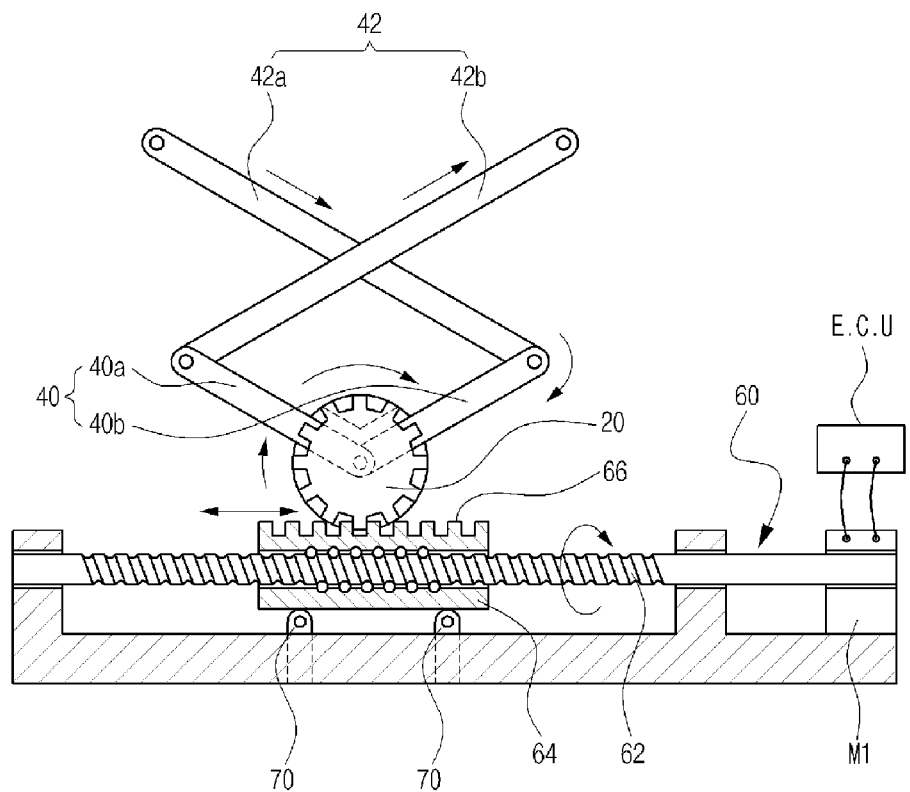
[Fig. 4]
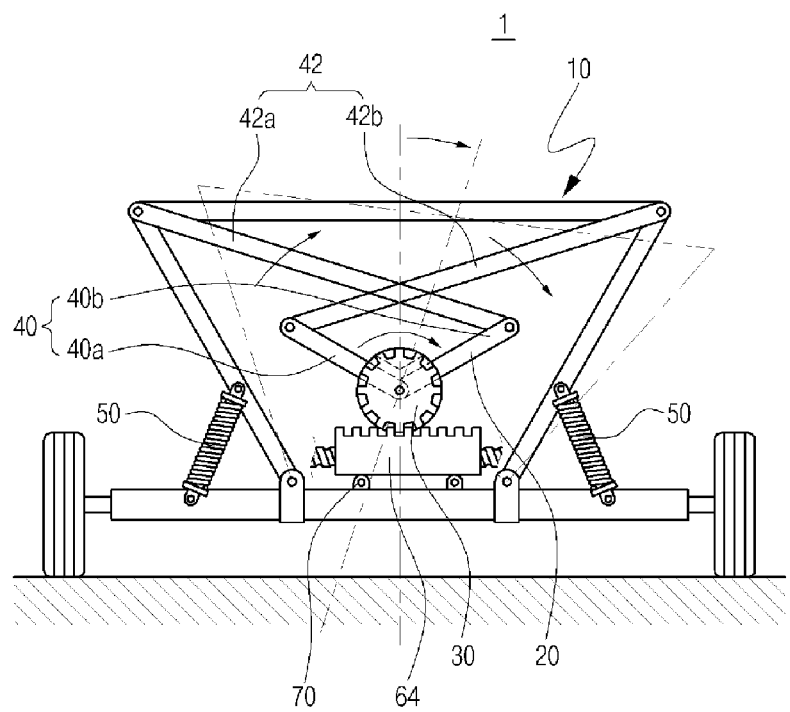

[Fig. 5]
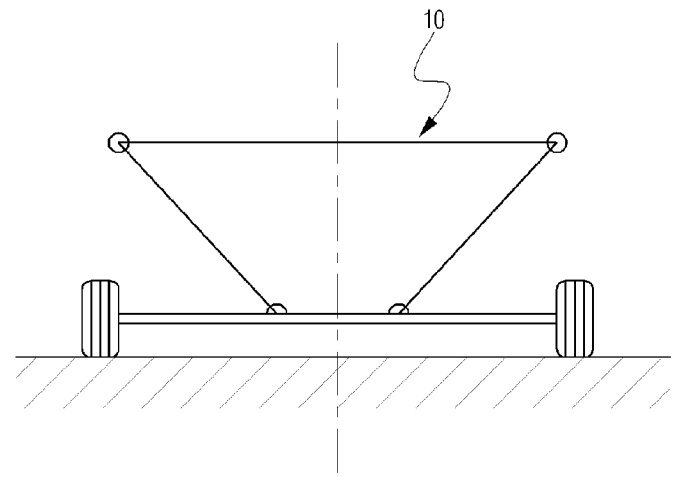
[Fig. 6]
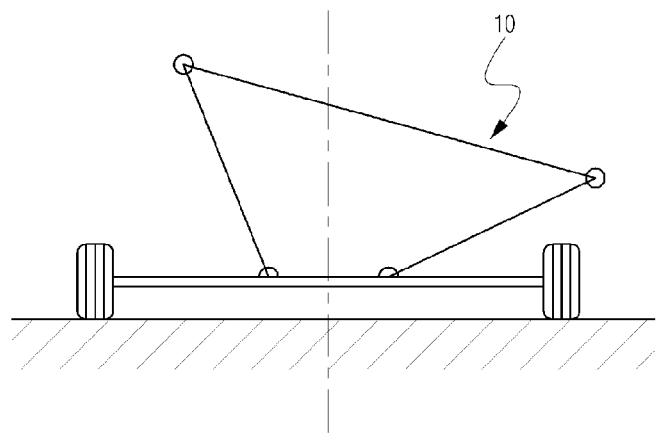
[Fig. 7]
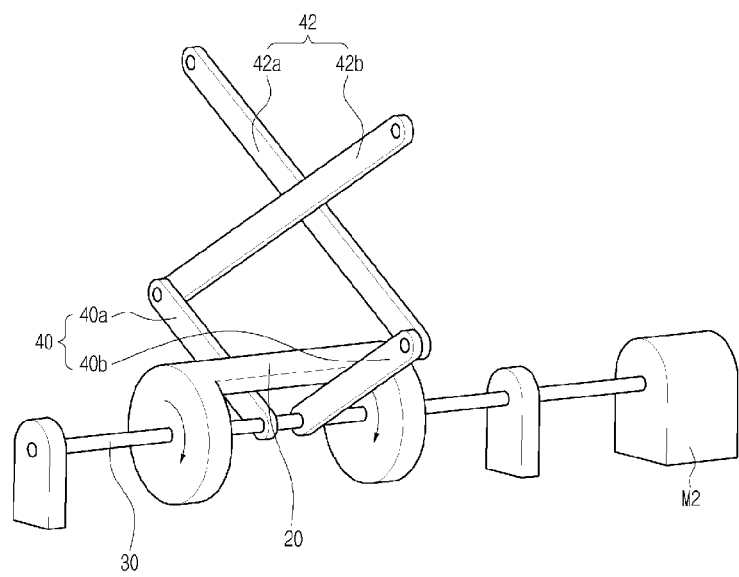

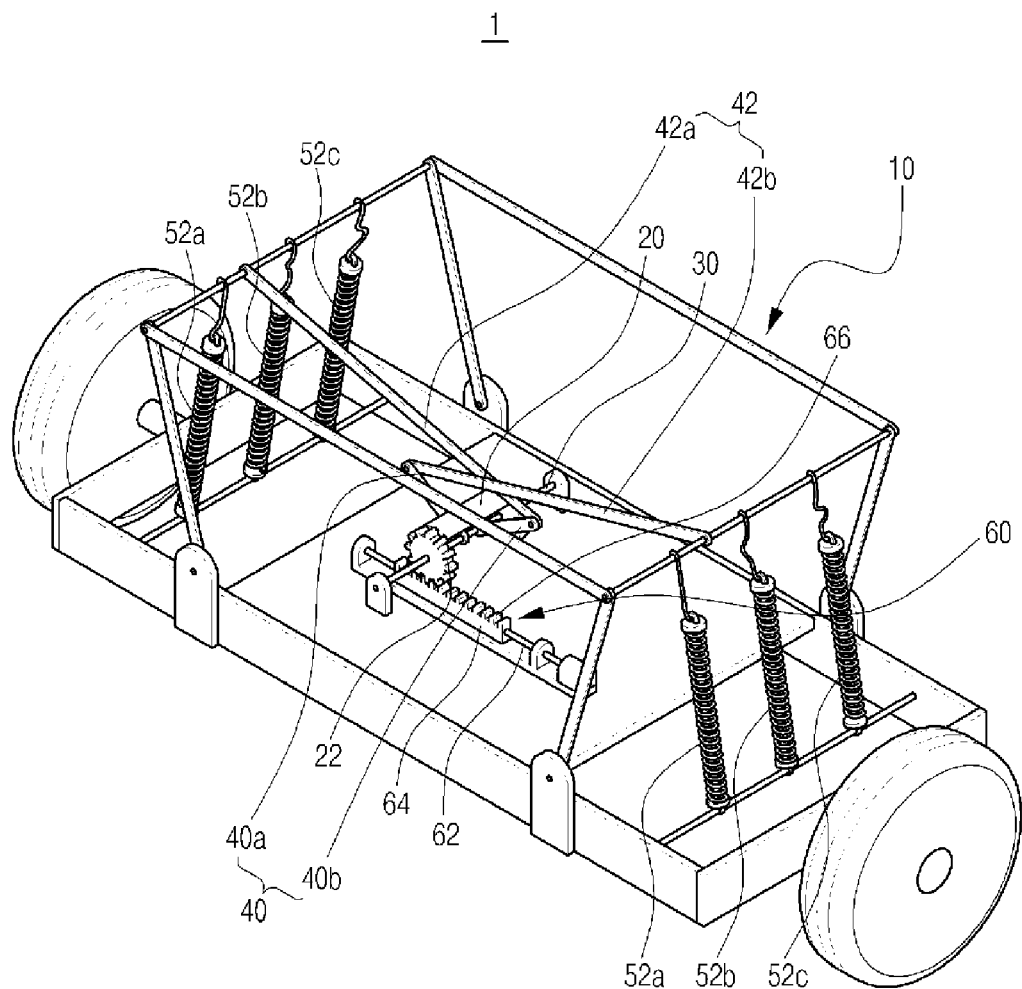
[Fig. 8]

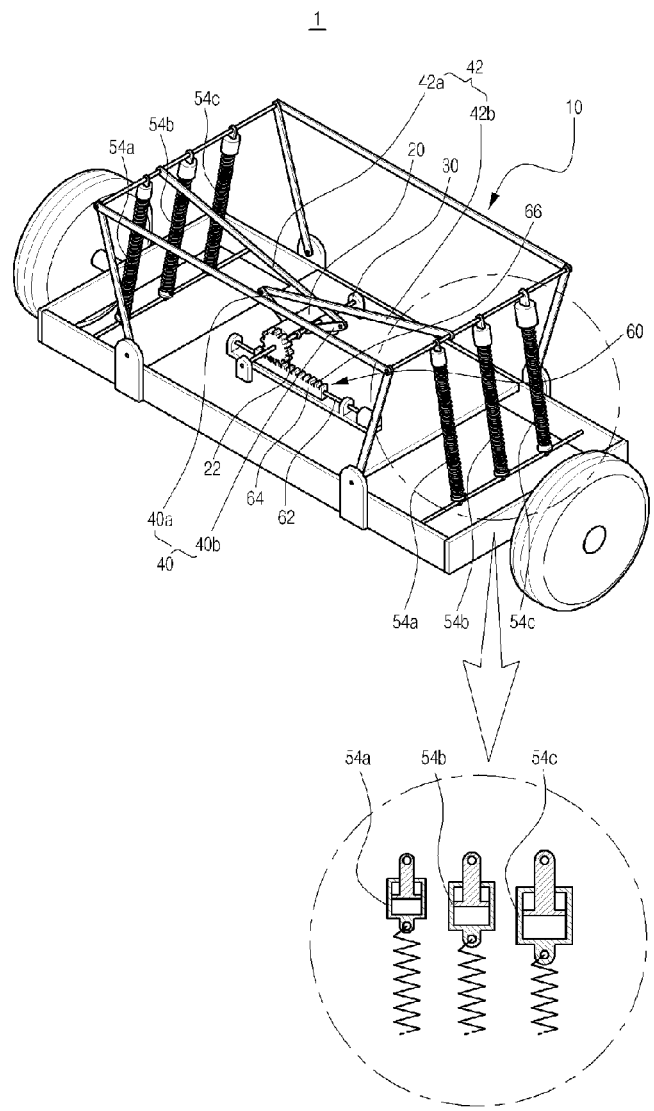
[Fig. 9]
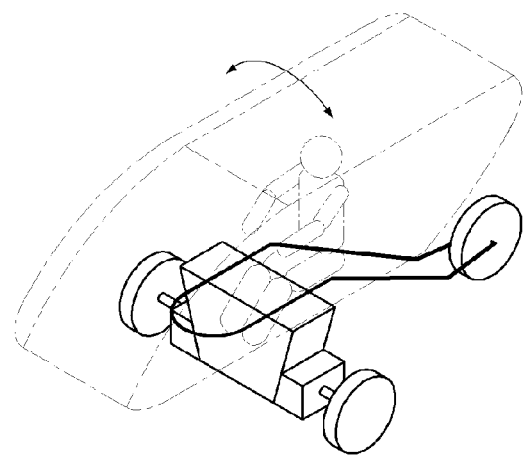
[Fig. 10]

[Fig. 11]
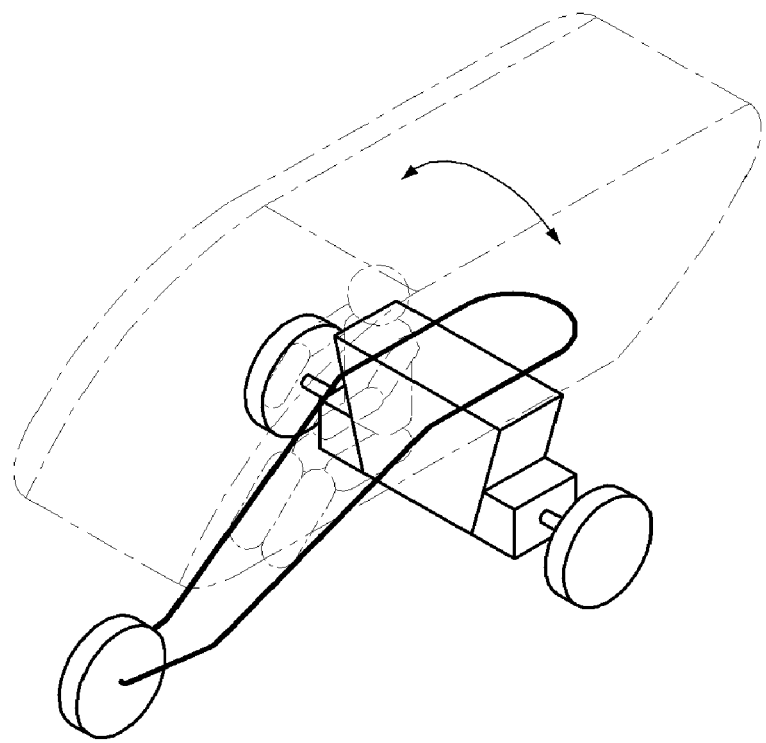
[Fig. 12]
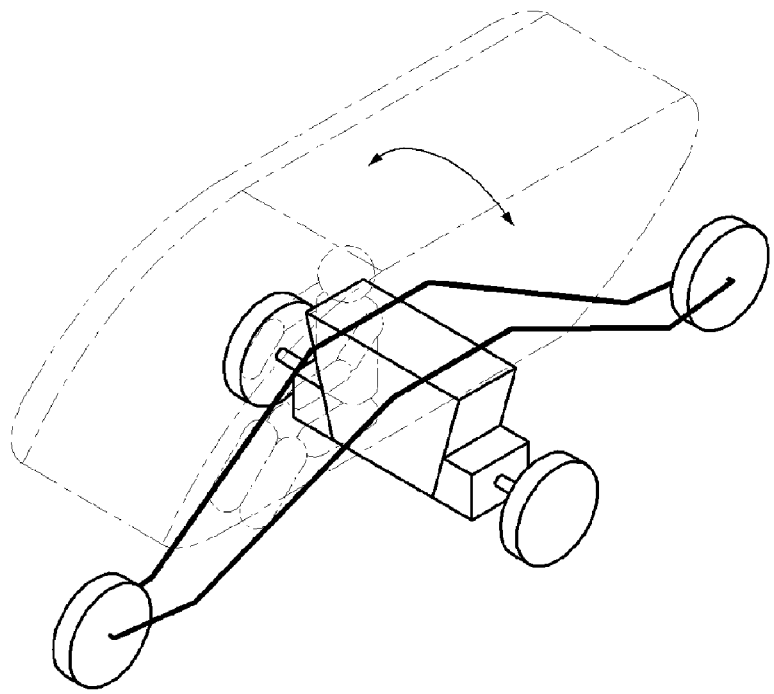

APPARATUS FOR SHIFTING THE CENTER OF GRAVITY OF A VEHICLE HAVING THREE WHEELS OR MORE

TECHNICAL FIELD

The present invention relates to a vehicle having three wheels or more, and more particularly to an apparatus for shifting the center of gravity of a vehicle having three or more wheels by which upon driving in a curve in the road, the center of gravity of the vehicle is shifted to the left/right side relative to the driving direction so as to secure stability and safe driving.

BACKGROUND ART

In general, a tricar means a vehicle having three wheels, wherein two wheels are mounted before the driver and one wheel is mounted behind the driver (called in general a reversed tricar), or otherwise, two wheels are mounted behind the driver and one wheel is mounted before the driver (called in general a regular tricar).

To secure the stability and safety of the tricar during driving in a linear road and a curve, it should be configured such that the breadth of the car at a position where two wheels are mounted in parallel is made larger than that of a common 4-wheel car, or that like a motorcycle, the center of gravity is momentarily shifted partially or completely in the direction of the centripetal force opposite to the centrifugal force. The former case causes the vehicle to have a large size due to an increase in breadth thereof, and the latter case causes the problems of stability and safety thereof upon the momentary shift of the center of gravity. Because of this, development of the tricar has been carried out by excluding the former case but solving the problems of the latter case.

Recently, more particularly, in the 1997 Frankfurt motor show, Mercedes-Benz was noted worldwide for an announcement of a new concept reversed tricar named 'F300 Life-jet'. However, such a reversed tricar had a problem in that power beyond a reasonable need was consumed, and power required for a shift itself of the center of gravity of a car body was also consumed because the tricar was designed so that upon shifting the center of gravity, the car body and all wheels were to be tilted in the direction of the driver's manipulation. In addition, such a tricar still had a problem of shaking upon restoration to a regular position after the shift of the center of gravity, upon stopping, and upon boarding.

Furthermore, also in the recent Tokyo motor show, Phiaro, Japan was noted worldwide for an announcement of a regular tricar named "P67b ETERNITY". However, in such a regular tricar, the center point of the shift circle of the center of gravity is positioned above the ground, so that upon shifting the center of gravity, side-skidding occurs on a wheel, thereby causing severe wearing of a tire thereof. Such a phenomenon will be weighted particularly upon driving on a curve. In addition, such a tricar is designed so that the center of gravity of an engine installed on the side of rear wheels having the largest weight in a car body is not shifted, so that upon driving on a curve, there will be a greater possibility of incurring an accident as compared to the reversed tricar.

DISCLOSURE OF INVENTION

Technical Problem

Therefore, the present invention has been made in view of the above-mentioned problems, and the present invention provides an apparatus for shifting the center of gravity of a vehicle having three wheels or more requiring the shifting of the center of gravity to the left/right relative to a driving direction, capable of, upon driving of the vehicle, shifting and restoring the center of gravity more easily, effectively, and precisely, and upon stopping, precisely controlling the left/right movement.

Technical Solution

In accordance with an aspect of the present invention, there is provided an apparatus for shifting the center of gravity of a vehicle having three wheels or more, including: a movable frame movably fixed, at one side, to a vehicle body in such a manner that a portion or all of the frame is movable to the left/right side relative to the driving direction of the vehicle body, the frame being shaped like an inverse trapezoid, a regular trapezoid, a rectangle, a square, a regular triangle, or an inverse triangle; and a control unit for controlling the left/right movement of the frame to shift the center of gravity of the vehicle body as needed, the control unit including: (i) a cylindrical rotation body in which a portion of the inside thereof including the center of rotation is open; (ii) a rotation bar coaxially coupled to the center of rotation of the rotation body to rotate with the rotation body along with the rotation of the rotation body; (iii) a first link member rotatably coupled, at its one end, to the rotation bar included inside the rotation body; and (iv) second link members crossed each other, each second link member having opposite ends wherein one end is rotatably coupled to the other end of the first link member, and the other end is rotatably coupled to the upper portion of the frame.

In a preferred embodiment, an elastic support member is coupled between the left/right sides of the frame and the vehicle body under the left/right sides. The elastic support member may be selected from one in type of a common compression spring having the same tension, one in type of a combination of a wire having a different length and a compression spring, or one in type of a combination of a piston having a different size or length and a compression spring. Such an elastic support member serves to allow the frame, upon the curved driving of the vehicle, shifted to one side by the shift of the center of gravity thereof, to remain at that position with minimum power. On the contrary, when the vehicle is switched from the curved driving into the linear driving, the elastic support member serves to allow the shifted frame to easily return to its original position with minimum power.

In a preferred embodiment, the control unit for shifting the center of gravity further including a ball screw device having a ball screw and a ball nut, the cylindrical portion of the rotation body further includes a gear unit integrally or separately, and the ball nut is provided, at a position contacting the gear unit, with a linear gear unit engaged with the gear unit to cause the rotating operation of the gear unit.

In the ball screw device, the shuttling motion of the ball nut relative to the ball screw is carried out by an electric motor or a hydraulic actuator.

The electric motor or the hydraulic actuator is preferably controlled by an electronic control unit (ECU).

ADVANTAGEOUS EFFECTS

As set forth above, according to the apparatus for shifting the center of gravity of a vehicle having three wheels or more requiring the shifting of the center of gravity to the left/right relative to a driving direction, upon driving of the vehicle, the center of gravity is shifted and restored more easily, effectively, and precisely, and upon stopping, the left/right movement is precisely controlled.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a perspective view illustrating the main part of an apparatus for shifting the center of gravity according to a preferred embodiment of the present invention;

FIG. 2 is a perspective view illustrating the main part of a control unit for controlling the shift of the center of gravity of the shifting apparatus in FIG. 1;

FIG. 3 is a partial sectional view of the control unit in FIG. 2;

FIG. 4 is a front view of the shifting apparatus in FIG. 1;

FIG. 5 is a view illustrating a frame during linear driving;

FIG. 6 is a view illustrating a frame during curved driving;

FIG. 7 is a view illustrating a modification of the control unit in FIGS. 2 to 4;

FIG. 8 is a perspective view illustrating the main part of an apparatus for shifting the center of gravity according to another preferred embodiment of the present invention;

FIG. 9 is a perspective view illustrating the main part of an apparatus for shifting the center of gravity according to a further preferred embodiment of the present invention; and FIGS. 10 to 12 are views illustrating various vehicles, to which the apparatus for shifting the center of gravity according to the present invention can adapt, wherein FIG. 10 illustrates a reversed tricar, FIG. 11 illustrates a regular tricar, and FIG. 12 illustrates a lozenge-shaped vehicle.

BEST MODE FOR CARRYING OUT THE INVENTION

Hereinafter, exemplary embodiments of the present invention will be described with reference to the accompanying drawings. The drawings and description thereof have been provided for illustrative purposes, so the present invention is not limited thereto, and those skilled in the art will appreciate that various modifications, additions and substitutions are possible, within the scope of the invention.

FIG. 1 schematically illustrates the main part of an apparatus for shifting the center of gravity (hereinafter also referred to as "the shifting apparatus") adapted to a vehicle having three wheels or more according to a preferred embodiment of the present invention. FIGS. 2 and 3 illustrate a control unit for controlling the shift of the center of gravity in the shifting apparatus (FIG. 3 is a perspective view, and FIG. 4 is a partial sectional view). FIGS. 4 to 6 illustrate the operation state of the shifting apparatus according to the preferred embodiment of the invention.

Referring to these drawings, the apparatus 1 for shifting the center of gravity includes a movable frame having a certain shape, and a control unit for controlling the left/right shift of the frame 10 to shift the center of gravity to the left/right side as needed.

The movable frame 10, as shown in FIG. 1, is movably fixed, at its one end, to a vehicle body in such a manner that a portion thereof is movable in the left/right direction relative to the driving direction of the vehicle body. In the present embodiment, while the movable frame 10 is illustrated in an inverse trapezoidal shape, the frame may have other shape such as a regular trapezoid, a square, a rectangle, a regular triangle, an inverse triangle, and others. Among them, particularly, the inverse trapezoidal frame 10 can be moved to the left/right side with lesser force, thereby improving the controllability of the vehicle.

The control unit for shifting the center of gravity includes a rotation body 20, a rotation bar 30 coaxially coupled to the center of rotation of the rotation body 20, a first link member 40 restricted by the rotation of the rotation body 20, and second link member 42 each having opposite ends, one end being coupled to the first link member, and the other end being rotatably coupled to the upper portion of the frame 10. The rotation body 20 is open at a portion thereof including the center of rotation. While the embodiment illustrates that the rotation body 20 is shaped like a cylinder, it may take any shape if the shape does not have a bad influence upon the rotation thereof. Preferably, the rotation bar 30 rotates along with the rotation of the rotation body 20. The first link member 40 is rotatably coupled, at its one end, to the rotation bar 30 included in the inside of the rotation body 20. The second link members are crossed with each other as shown in the drawing.

In addition, the control unit for the shift of the center of gravity further includes a ball screw device 60 consisting of a ball screw 62 and a ball nut 64 so as to precisely rotate the rotation body 20, in addition to the above-mentioned elements. Meanwhile, the cylindrical portion of the rotation body 20 is further integrally provided with a gear unit 22, and the ball nut 64 is provided, at a portion contacting the gear unit 22, with a linear gear unit 66 that is engaged with the gear unit 22 to cause the rotation operation of the gear unit 22. In the present embodiment, while the gear unit 22 is integrally provided to the rotation body 20, it may be separately provided if it can cause the rotation operation of the rotation body 20.

The ball screw device 60 includes a bearing between the ball nut-side inside and the ball screw 62, allowing the precise control of the ball nut 64. By the ball screw device 60, the rotation operation of the rotation body 20 is carried out more precisely. Moreover, the ball screw device 60 restricts the left/right movement of the vehicle when the vehicle is stopped or even driven.

A shuttling motion of the ball nut 64 relative to the ball screw 62 in the ball screw device is carried out by an electric motor M1 or a hydraulic actuator (not shown). The electric motor M1 or the hydraulic actuator is controlled by an electronic control unit (ECU).

For the prevention of curving and smooth linear movement, an anti-curving roller or rail 70 is disposed under the ball nut 64. Such an anti-curving roller or rail 70 is directly or indirectly fixed to the vehicle body under the ball nut 64.

Referring again to FIGS. 2 to 4, the rotation body 20 rotates in a specified direction (e.g., an arrow direction in FIGS. 3 and 4) by the driving of the ball screw device 60 by the electric motor M1. The rotation body 20 is open at its internal part including the center thereof, so that upon the movement of the rotation body 20 in an arrow direction, the first link member denoted as a reference numeral 40b on the right side of the drawing is pushed by the inner portion of the rotation body 20, thereby lowering. By the push-down of the first link member 40b, the whole of the movable frame 10 is tilted to a specified direction (in this case, to the right direction on the drawing) (See FIG. 4, particularly). That is, the center of the vehicle is shifted to the direction (i.e., centripetal force direction) opposite to the centrifugal force of the vehicle, thereby securing safe driving even upon curved driving.

Moreover, the control unit of the shifting apparatus 1 of the present invention further includes an elastic support member 50 in addition to the above-mentioned elements. In the present embodiment, compression springs are used as the elastic support member 50. The springs 50 are disposed between the left side of the frame 10 and the vehicle body under the left side of the frame 10, and between the right side of the frame 10 and the vehicle body under the right side of the frame 10.

Although the center of gravity of the frame 10 is shifted to a specified direction by the rotation body 20, the spring 50 supports the portion in the counter direction, allowing the center of gravity to be shifted as needed, and allowing the vehicle body to easily return to its original state when there is no need to shift the center of gravity. The springs 50 are disposed between the left side of the frame 10 and the vehicle body under the left side of the frame 10, and between the right side of the frame 10 and the vehicle body under the right side of the frame 10. As the number of springs 50 increases, the driving stability of the vehicle is secured more firmly. While the present embodiment employs the plurality of springs 50 having the same tension, it may be configured such that the springs 50 having different tension or the structure in which the tension is made different are sequentially installed on the left/right sides of the frame. Detailed description thereof will be made later with reference to the drawings.

FIG. 7 illustrates a modification of the control unit for the shift of the center of gravity. In this embodiment, unlike the above embodiment, an electric motor M2 is directly coupled to the rotation bar 30.

FIG. 8 illustrates an apparatus 1 for shifting the center of gravity according to another preferred embodiment of the present invention. The shifting apparatus 1 in FIG. 8 is identical to the shifting apparatus 1 in FIG. 1, excluding that the elastic support member consists of wires and compression springs.

Referring to FIG. 8, the elastic support members 52a, 52b, and 52c used in the shifting apparatus 1 is in combination of the wires (upper portion) and the compression springs (lower portion). In the elastic support members 52a, 52b, and 52c, the compression springs have the same length, but the wires have the different lengths. Making the lengths of the wires different is for, upon the movement of the frame 10 in a specified direction, allowing the elastic support members 52a, 52b, and 52c positioned opposite to the movement to sequentially operate. In this case, the elastic support member denoted as 52a first operates, the elastic support member 52b having a loose wire then operates, and the elastic support member 52c having a looser wire finally operates. The number of the elastic support members is dependent upon the selection of those skilled in the art considering the weight of the vehicle body, the number of passengers, etc.

FIG. 9 illustrates an apparatus for shifting the center of gravity according to a further preferred embodiment of the present invention. The shifting apparatus 1 in FIG. 9 is identical to the shifting apparatus 1 in FIG. 1, excluding that the elastic support member consists of pistons and compression springs.

Referring to FIG. 9, the elastic support members 54a, 54b, and 54c used in the shifting apparatus 1 is in combination of the pistons (upper portion) and the compression springs (lower portion). In the elastic support members 54a, 54b, and 54c, the lengths or sizes of the pistons and the compression springs are inversely proportional to each other. To make the length or size of the pistons different is for, upon the movement of the frame 10 in a specified direction, allowing the elastic support members 54a, 54b, and 54c positioned opposite to the movement to sequentially operate. In this case, the elastic support member denoted as 54a first operates, the elastic support member 54b having a larger or longer piston then operates, and the elastic support member 54c having a largest or longest piston finally operates. The number of the elastic support members is dependent upon the selection of those skilled in the art considering the weight of the vehicle body, the number of passengers, etc.

FIGS. 10 to 12 illustrate various vehicles to which the shifting apparatus of the present invention can be adapted. That is, FIG. 10 illustrates a reversed tricar, FIG. 11 illustrates a regular tricar, and FIG. 12 illustrates a lozenge-shaped vehicle. These vehicles are common with each other in that the center of gravity should be momentarily shifted by the operation manipulation of a driver in order to secure stability of the vehicle as well as the driver.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An apparatus for shifting the center of gravity of a vehicle, said vehicle comprising a body and three wheels or more, the apparatus comprising:
    a movable frame having a certain shape and an upper portion, said frame movably connected, at one side, to a vehicle body in such a manner that a portion or all of the frame is movable to the left/right relative to the driving direction of the vehicle body;
    a control unit for controlling the left/right movement of the frame to shift the center of gravity of the vehicle body, wherein the control unit comprises:
        (i) a rotation body comprising a cylindrical portion and a center of rotation, wherein a portion of the inside of the rotation body including the center of rotation is open;
        (ii) a rotation bar coaxially coupled to the center of rotation of the rotation body to rotate with the rotation body:
        (iii) a first link member rotatably coupled, at its one end, to the rotation bar; and
        (iv) second link members crossed with each other, each second link member having opposite ends wherein one end is rotatably coupled to the other end of the first link member, and the other end of each second link member is rotatably coupled to the upper portion of the frame;
    wherein the control unit for shifting the center of gravity further comprises a ball screw device comprising a ball screw and a ball nut, the cylindrical portion of the rotation body further comprises a gear unit integrally or separately, and the ball nut is provided, at a position contacting the gear unit, with a linear gear unit engaged with the gear unit to cause the rotating operation of the gear unit.

2. The apparatus according to claim 1, comprising an anti-curving roller or rail disposed under the ball nut such that the anti-curving roller or rail is directly or indirectly fixed to the vehicle body under the ball nut.

3. The apparatus according to claim 2, wherein the shape of the frame is selected from a group including an inverse trapezoid, a regular trapezoid, a rectangle, a square, a regular triangle, and an inverse triangle.

4. The apparatus according to claim 1, further comprising means for shuttling the ball nut relative to the ball screw.

5. The apparatus according to claim 4, wherein said shuttling means is controlled by an electronic control unit.

6. The apparatus according to claim 5, wherein the shape of the frame is selected from a group including an inverse trapezoid, a regular trapezoid, a rectangle, a square, a regular triangle, and an inverse triangle.

7. The apparatus according to claim 4, wherein the shape of the frame is selected from a group including an inverse trapezoid, a regular trapezoid, a rectangle, a square, a regular triangle, and an inverse triangle.

8. The apparatus according to claim 4, wherein said shuttling means comprises an electric motor.

9. The apparatus according to claim 1, wherein the shape of the frame is selected from a group including an inverse trapezoid, a regular trapezoid, a rectangle, a square, a regular triangle, and an inverse triangle.

10. An apparatus for shifting the center of gravity of a vehicle, said vehicle comprising a body and three wheels or more, the apparatus comprising:
 a movable frame having a certain shape, left/right sides and an upper portion, said frame movably connected, at one side, to a vehicle body in such a manner that a portion or all of the frame is movable to the left/right relative to the driving direction of the vehicle body;
 a control unit for controlling the left/right movement of the frame to shift the center of gravity of the vehicle body, wherein the control unit comprises:
  (i) a rotation body comprising a cylindrical portion and a center of rotation., wherein a portion of the inside of the rotation body including the center of rotation is open;
  (ii) a rotation bar coaxially coupled to the center of rotation of the rotation body to rotate with the rotation body;
  (iii) a first link member rotatably coupled, at its one end, to the rotation bar; and
  (iv) second link members crossed with each other, each second link member having opposite ends wherein one end is rotatably coupled to the other end of the first link member, and the other end of each second link member is rotatably coupled to the upper portion of the frame;
 wherein an elastic support member is coupled between the left/right sides of the frame and the vehicle body under the left/right sides;
 wherein the control unit for shifting the center of gravity further comprises a ball screw device comprising a ball screw and a ball nut, the cylindrical portion of the rotation body further comprises a gear unit, and the ball nut is provided, at a position contacting the gear unit, with a linear gear unit engaged with the gear unit to cause the rotating operation of the gear unit.

11. The apparatus according to claim 10 wherein the shape of the frame is selected from a group including an inverse trapezoid, a regular trapezoid, a rectangle, a square, a regular triangle, or an inverse triangle.

12. An apparatus for shifting the center of gravity of a vehicle, said vehicle comprising a body and three wheels or more, the apparatus comprising:
 a movable frame having a certain shape and an upper portion, said frame movably connected, at one side, to a vehicle body in such a manner that a portion or all of the frame is movable to the left/right relative to the driving direction of the vehicle body;
 a control unit for controlling the left/right movement of the frame to shift the center of gravity of the vehicle body, wherein the control unit comprises:
  (i) a rotation body comprising a cylindrical portion and a center of rotation, wherein a portion of the inside of the rotation body including the center of rotation is open;
  (ii) a rotation bar coaxially coupled to the center of rotation of the rotation body to rotate with the rotation body;
  (iii) a first link member rotatably coupled, at its one end, to the rotation bar; and
  (iv) second link members crossed with each other, each second link member having opposite ends wherein one end is rotatably coupled to the other end of the first link member, and the other end of each second link member is rotatably coupled to the upper portion of the frame;
 an elastic support member coupled between the left/right sides of the frame and the vehicle body under the left/right sides;
 wherein the elastic support member comprises compression springs having the same tension; and
 wherein the control unit for shifting the center of gravity further comprises a ball screw device comprising a ball screw and a ball nut, the cylindrical portion of the rotation body further comprises a gear unit, and the ball nut is provided, at a position contacting the gear unit, with a linear gear unit engaged with the gear unit to cause the rotating operation of the gear unit.

13. The apparatus according to claim 12 wherein the shape of the frame is selected from a group including an inverse trapezoid, a regular trapezoid, a rectangle, a square, a regular triangle, or an inverse triangle.

14. An apparatus for shifting the center of gravity of a vehicle, said vehicle comprising a body and three wheels or more, the apparatus comprising:
 a movable frame having a certain shape and an upper portion, said frame movably connected, at one side, to a vehicle body in such a manner that a portion or all of the frame is movable to the left/right relative to the driving direction of the vehicle body;
 a control unit for controlling the left/right movement of the frame to shift the center of gravity of the vehicle body, wherein the control unit comprises:
  (i) a rotation body comprising a cylindrical portion and a center of rotation, wherein a portion of the inside of the rotation body including the center of rotation is open;
  (ii) a rotation bar coaxially coupled to the center of rotation of the rotation body to rotate with the rotation body;
  (iii) a first link member rotatably coupled, at its one end, to the rotation bar; and
  (iv) second link members crossed with each other, each second link member having opposite ends wherein one end is rotatably coupled to the other end of the first link member, and the other end of each second link member is rotatably coupled to the upper portion of the frame;
 wherein an elastic support member is coupled between the left/right sides of the frame and the vehicle body under the left/right sides;
 wherein the elastic support member comprises a combination of wires having a different length and compression spring, or a combination of pistons having a different size or length and compression springs;
 wherein the control unit for shifting the center of gravity further comprises a ball screw device comprising a ball screw and a ball nut, the cylindrical portion of the rotation body further comprises a gear unit, and the ball nut is provided, at a position contacting the gear unit, with a linear gear unit engaged with the gear unit to cause the rotating operation of the gear unit.

15. The apparatus according to claim 14 wherein the shape of the frame is selected from a group including an inverse trapezoid, a regular trapezoid, a rectangle, a square, a regular triangle, or an inverse triangle.

* * * * *